US 6,731,252 B2

(12) United States Patent
Sugiyama et al.

(10) Patent No.: US 6,731,252 B2
(45) Date of Patent: May 4, 2004

(54) DISPLAY SOURCE UNIT FOR DISPLAY DEVICE IN VEHICLE

(75) Inventors: Tetsuya Sugiyama, Shizuoka (JP); Go Nakamura, Shizuoka (JP); Kunimitsu Aoki, Shizuoka (JP); Kousuke Kinoshita, Shizuoka (JP); Takanori Watanabe, Shizuoka (JP); Yoshihide Takada, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 182 days.

(21) Appl. No.: 10/035,436

(22) Filed: Jan. 4, 2002

(65) Prior Publication Data
US 2002/0109648 A1 Aug. 15, 2002

(30) Foreign Application Priority Data
Feb. 9, 2001 (JP) ........................................ 2001-033611

(51) Int. Cl.$^7$ ................................................ G09G 5/00
(52) U.S. Cl. .................. 345/6; 345/7; 345/8; 359/632; 359/817; 359/630; 340/980
(58) Field of Search .......................... 345/1.1, 1.2, 1.3, 345/2.1, 2.2, 2.3, 3.4, 9, 8, 156, 166, 4–6; 359/605, 612, 630, 631, 632, 633, 638–639, 817; 340/980

(56) References Cited
U.S. PATENT DOCUMENTS 5,056,890 A * 10/1991 Iino et al. .................... 359/630
6,072,444 A *  6/2000 Burns ............................ 345/7

* cited by examiner

Primary Examiner—Lun-Yi Lao
Assistant Examiner—Mansour M. Said
(74) Attorney, Agent, or Firm—Armstrong, Kratz, Quintos, Hanson & Brooks, LLP

(57) ABSTRACT

A display source unit for a display device in a vehicle is provided, by which the driver is not given a physical or mental oppressive feeling to his or her head upon getting on and off the vehicle. The display source unit 9, which irradiates a light of a display image containing instrument information on a combiner 7 situated in front of an eye point I so that the irradiated light can be seen as a virtual image S from the eye point I, is provided with a cover member 13 consisting of: a front cover body 15 putting an optical element 21 for image magnification thereonto; and a rear cover body 17 hinged to the front cover body 15 with receiving a display device 23 therein. The cover member 13 is folded, thereby the light of the display image displayed on a display surface 23a of the display device 23 is reflected on a reflector 25 disposed in the cover member 13 to the optical element 21, passes through the optical element 21, and goes toward the eye point I after being reflected by the combiner 7.

5 Claims, 2 Drawing Sheets

DISPLAY SOURCE UNIT FOR DISPLAY DEVICE IN VEHICLE

BACKGROUND OF THE INVENTION (1) Field of the Invention

The present invention relates to a display source unit for a display device in a vehicle, by which a light of a display image to be seen as a virtual image from an eye point in the vehicle is projected on a position visible from the eye point.

(2) Description of the Related Art

In a head up display, a virtual image of a display image containing information for vehicle driving is displayed on a windshield or combiner, thereby the virtual image can be superposably seen together with the foreground of the vehicle seen through the windshield or combiner. In such a head up display, as pointed out in Japanese Patent Application Laid-Open No. H5-77567, a display source is preferably disposed at a ceiling in the interior of the vehicle in order not to be affected by sunlight.

The display source disclosed in Japanese Patent Application Laid-Open No. H5-77567 is disposed at a ceiling portion behind an eye point in the interior of a vehicle so that the display source does not give a visual oppressive feeling to a driver by existing within a visual field of the driver and in addition, the combiner is disposed near the ceiling so that a light of a display image projected from the display source is not blocked by the driver.

However, when the display source is disposed at the ceiling portion in the interior of a vehicle, required is not only a consideration, like a consideration in the display source disclosed in Japanese Patent Application Laid-Open No. H5-77567, that the display source be disposed behind an eye point so that the display source does not enter into a visual field of the driver, but also a consideration that the display source does not give a physical or mental oppressive feeling to a head of the driver in such a manner that the display source does not obstruct the driver from getting on and off the vehicle taking an emergency such as an accident into consideration.

SUMMARY OF THE INVENTION

It is therefore an objective of the present invention to solve the above problem and to provide a display source unit for a display device in a vehicle, by which the display source does not give a physical or mental oppressive feeling to a head of the driver when the driver gets on and off the vehicle, in a situation that the display source, which displays a display image and projects a light thereof on a windshield or combiner, is disposed at the ceiling portion in the interior of the vehicle in order to display the light of the display image containing information for vehicle driving on the windshield or combiner.

In order to attain the above objective, the present invention is to provide a display source unit for a display device in a vehicle disposed at a ceiling of the interior of the vehicle, by which a light of a display image to be seen as a virtual image from an eye point in the interior of the vehicle is projected on a projected position visible from the eye point in such a manner that the light is reflected on the projected position to the eye point, comprising a cover member, which is held by the ceiling and covers a part of the ceiling, consisting of two cover bodies divided each other in the front-and-rear direction of the vehicle, coupling the two cover bodies together in such a manner that a state of the coupling can be selected out of an unfolded state, in which the two cover bodies are brought close to the ceiling and extended along the ceiling, and a folded state, in which the two cover bodies are brought away from the ceiling and extended in an inclined direction relative to the ceiling, wherein a display device for luminously displaying the display image on a display surface thereof is mounted in the rear cover body out of the two cover bodies with the display surface facing the ceiling, while the front cover body out of the two cover bodies is provided with a light-outgoing section, which enables a light to come out from a space formed between the cover member and the part of the ceiling covered by the cover member toward the outside of said space, said space receives a reflector therein, and in the folded state of the cover member, the display device, the light-outgoing section and the reflector are relatively arranged to each other so that after being reflected by the reflector the light of the display image is irradiated on the projected position by way of the light-outgoing section and a virtual image of the display image is seen from the eye point.

With the construction described above, when the cover member is brought into the unfolded state from the folded state, the two cover bodies come close to the ceiling and extends along the ceiling, thereby the two cover bodies do not protrude toward the interior side of the vehicle.

Therefore, the driver is free from the physical or mental oppressive feeling to the head upon the driver's getting on and off the vehicle, since the cover member in the unfolded state is not an obstruction for the driver.

Preferably, in the unfolded state of the cover member, the display device, the light-outgoing section and the reflector are relatively arranged to each other so that after being reflected by the reflector the light of the display image is irradiated on a specific position in the interior of the vehicle by way of the light-outgoing section.

With the construction described above, upon the unfolded state of the cover member, the light of the display image displayed on the display surface of the display device is irradiated on the specific position in the interior of the vehicle by way of the light-outgoing section after being reflected by the reflector, thereby the light of the display image functions as a room lamp of the vehicle.

Preferably, the light-outgoing section consists of an optical element for image magnification, which is fit into the front cover body.

With the construction described above, when the beam of the light of the display image displayed on the display surface of the display device reaches the light-outgoing section after being reflected by the reflector, the beam of the light is enlarged by the optical element for image magnification, thereby the visibility of the virtual image of the display image is improved.

Preferably, the reflector is fixed in said space.

With the construction described above, when the cover member is brought into either the folded state or the unfolded state, the light-outgoing section and the display device are arranged at the respective suitable positions relatively to the reflector.

Therefore, the reflector has no necessity to be changed with respect to its position between the folded and unfolded states of the cover member, thereby the construction around the reflector can be simplified.

Preferably, both front and back ends of the cover member in the front-and-rear direction of the vehicle is regulated with respect to the movement thereof in the direction of approaching to and leaving from the ceiling, and at least one end out of both front and back ends of the cover member is movable in the front-and-rear direction of the vehicle.

With the construction described above, when at least one end out of both front and back ends of the cover member, the movement in the direction of approaching to and leaving from the ceiling of which is regulated, is moved in the front-and-rear direction of the vehicle, the junction part of the two cover bodies approaches to or leaves from the ceiling. Thereby, the state of the cover member can be easily changed between the folded and the unfolded state.

DESCRIPTION OF THE PREFERRED EMBODIMENTS

In the following, the preferred embodiments of a display source unit for a display device in a vehicle according to the present invention will be explained with reference to the attached drawings.

Figure 1:
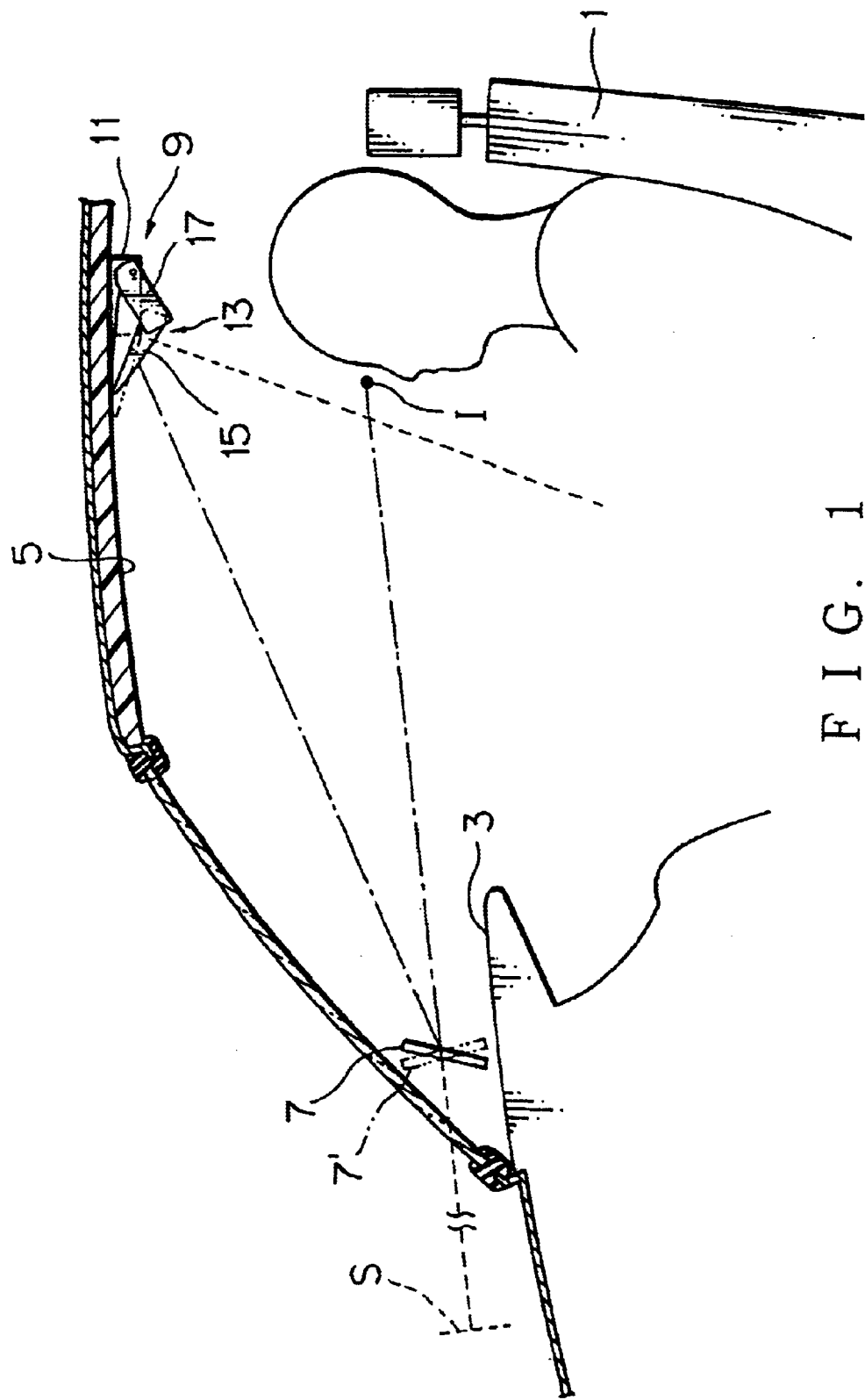
FIG. 1 is a cross sectional view illustrating a basic constitution of a display device for use in a vehicle, which adopts a display source unit for a display device in a vehicle according to a preferred embodiment of the present invention.

FIG. 1 is a cross sectional view illustrating a basic constitution of a display device for use in a vehicle, which adopts a display source unit for a display device in a vehicle according to the preferred embodiment of the present invention. The display device includes: a combiner 7 (corresponding to the projected position) of non-regular reflection-type hologram disposed on a dash-board 3 situated in front of an eye point I of the driver seated on the driver seat 1 in the vehicle; and a display source unit 9 disposed at the ceiling 5 above the driver seat 1.

Figure 2:
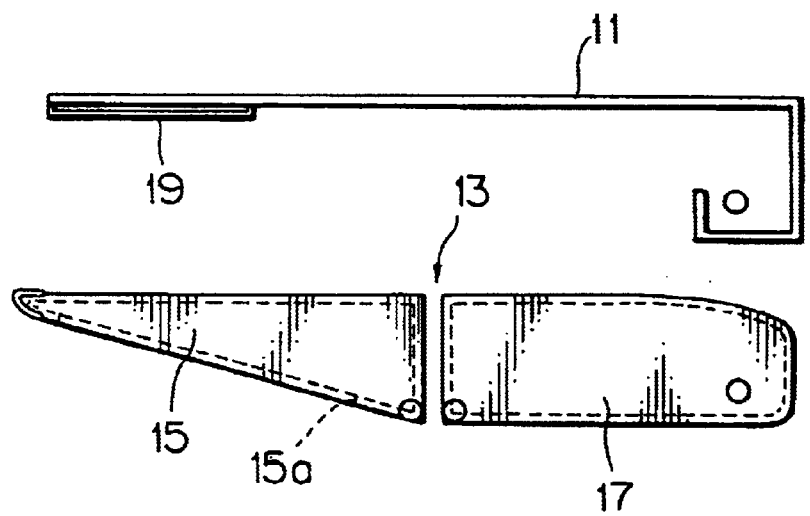
FIG. 2 is an enlarged exploded view of the display source unit shown in FIG. 1.

The display source unit 9 has a base 11 attached on the ceiling 5 and a cover member 13 supported by the base 11. FIG. 2 is an enlarged exploded view of the display source unit shown in FIG. 1. As shown in FIG. 2, the cover member 13 consists of two cover bodies divided each other in the front-and-rear direction of the vehicle, that is, a front cover body 15 and a rear cover body 17, with the rear end of the front cover body 15 being hinged to the front end of the rear cover body 17.

Figure 3:
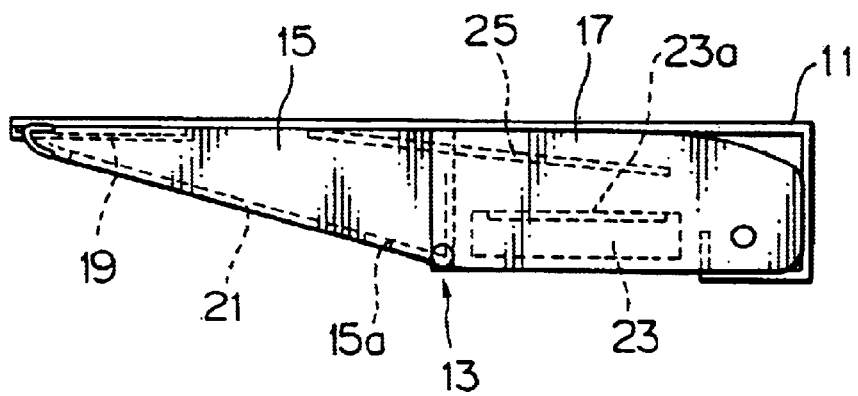
FIG. 3 is an enlarged view of the assembled display source unit of FIG. 2 in an extended state thereof.

FIG. 3 is an enlarged view of the assembled display source unit of FIG. 2 in an extended state thereof. As shown in FIG. 3, the front end of the front cover body 15 is supported by a guide rail 19 formed at the front end of the base 11 movably in the front-and-rear direction of the vehicle, thereby being restricted to move in the up-and-down direction of the vehicle. The rear end of the rear cover body 17 is hinged to the rear end of the base 11, thereby being restricted to move in the up-and-down direction of the vehicle as well as in the front-and-rear direction of the vehicle.

As shown in FIG. 3, the junction part between the rear end of the front cover body 15 and the front end of the rear cover body 17 being hinged to each other touches the ceiling 5, thereby the cover member 13 is held in its unfolded state, in which the front cover body 15 and the rear cover body 17 flatly extend along the ceiling 5, by click locking with a click mechanism (not shown in the figure) provided between the front end of the front cover body 15 and the guide rail 19.

Figure 4:
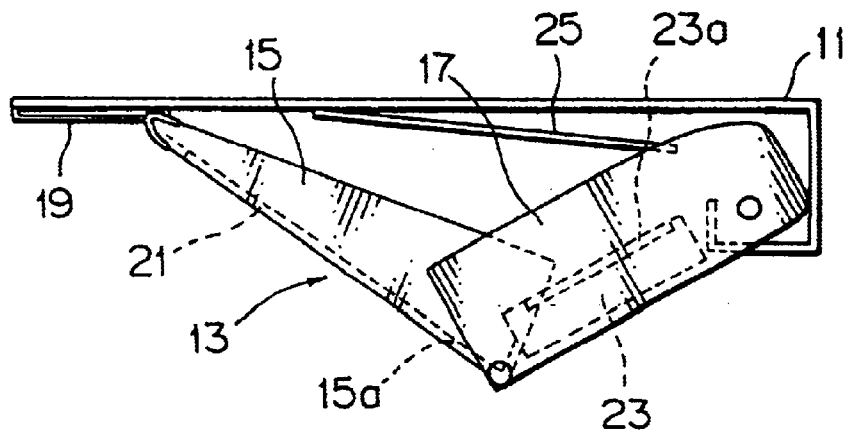
FIG. 4 is an enlarged view of the assembled display source unit of FIG. 2 in a folded state thereof.

FIG. 4 is an enlarged view of the assembled display source unit of FIG. 2 in a folded state thereof. As shown in FIG. 4, the junction part between the rear end of the front cover body 15 and the front end of the rear cover body 17 being hinged to each other is moved away from the ceiling 5 by an external force exceeding a click locking force by the click mechanism so that the front end of the front cover body 15 is slid backward along the guide rail 19 up to the end thereof and the rear end of the rear cover body 17 is oscillated relatively to the rear end of the base 11, thereby the cover member 13 is held in its folded state, in which the front cover body 15 is inclined forward while the rear cover body 17 is inclined backward.

The front cover body 15 is provided with a light transmission window 15a (corresponding to the light-outgoing section), onto which the optical element 21 for image magnification consisting of transparent member such as a Fresnel lens is put, while the inner surface of the rear cover body 17 mounts a display device 23 consisting of, for example, a natural light device (such as a field emission display, fluorescent display tube and electroluminescence display) and liquid crystal display with a backlight, with a display surface 23a of the display device 23 being faced the inside of the rear cover body 17.

The rear cover body 17 also receives a driving circuit (not shown in the figure) of the display device 23, to which a limit switch (not shown in the figure) that is set on when the cover member 13 is in either its unfolded state or folded state is connected.

A reflector 25 is attached to the base 11 in such a manner that the reflector 25 is situated inside the cover member 13 no matter when the cover member 13 is in its unfolded state or in its folded state.

The reflector 25 is attached to the base 11 with such an angle that makes a light be reflected toward the optical element 21 when the light of the display image displayed on the display surface 23a of the display device 23 passes through the optical element 21 and goes toward an eye point I of the driver seated on the driver seat 1 after being reflected by the combiner 7, in the state that the cover member 13 is folded.

The reflector 25 is attached to the base 11 with such an angle that makes a light be reflected toward the optical element when the light of the display image displayed on the display surface 23a of the display device 23 passes through the optical element 21 and goes toward a position (corresponding to the specific position in the interior of the vehicle) of the driver seated on the driver seat 1 or a fellow passenger seated on the assistant driver's seat (not shown in the figure) after being reflected by the combiner 7, in the state that the cover member 13 is unfolded.

In the following, an action of the display device in a vehicle according to the preferred embodiment constructed as described above will be explained.

When it is recognized that the cover member 13 is in its folded state by the limit switch described above, the rear cover body 17 is inclined backward so that the display surface 23a faces the reflector 25, which is situated a little forward from the ceiling portion right above the rear cover body 17.

When the cover member 13 is in its folded state, the front cover body 15 is inclined forward so that the back surface situated inside the base 11, out of the front and back surfaces of the optical element 21, faces the reflector 25, which is situated a little backward from the ceiling portion right above the front cover body 15.

When the cover member 13 is in its folded state, when a display image containing instrument information is displayed on the display surface 23a of the display device 23, which is driven by a driving circuit (not shown in the figure) received in the rear cover body 17, the light of the display image is reflected by the reflector 25, passes through the optical element, reaches the combiner 7 as shown by alternate long and short dash lines in FIG. 1, and is reflected on the combiner 7 to the eye point I of the driver seated on the driver seat 1.

Therefore, when the cover member 13 is in its folded state, the display image becomes an enlarged virtual image S by the optical element 21, which is seen from the eye point I at the rear of the combiner 7.

To the contrary, when it is recognized that the cover member 13 is in its unfolded state by the limit switch described above, neither the front cover body 15 nor the rear cover body 17 faces the reflector 25, instead they face respective ceiling portion right above them.

When the cover member 13 is in its unfolded state, the display device 23 is driven by the driving circuit (not shown in the figure) received in the rear cover body 17, for example, only a backlight is turned on, an unfigured display image is displayed on the display surface 23a of the display device 23 by using bright color for illumination, thereby a diffused light of the image is emitted from the display surface 23a.

Since the light of the display image is now the diffused light, a part of the diffused light is irradiated on the reflector 25, which is not faced by the rear cover body 17, a part of the light of the display image reflected by the reflector 25 passes through the optical element 21 due to a relation between an entrance angle and reflection angle of the light of the display image relative to the reflector 25, and the part of the light is irradiated to the position of the driver seated on the driver seat 1 or the fellow passenger seated on the assistant driver's seat (not shown in the figure) as shown by a dotted line in FIG. 1.

Therefore, when the cover member 13 is in its unfolded state, the display image for illumination displayed on the display surface 23a illuminates the position of the driver seated on the driver seat 1 or the fellow passenger seated on the assistant driver's seat.

When the cover member 13 is in its folded state, the junction part between the rear end of the front cover body 15 and the front end of the rear cover body 17 is moved away from the ceiling 5 protruding toward the interior of the vehicle. On the other hand, when the cover member 13 is in its unfolded state, the junction part touches the ceiling 5, thereby the front cover body 15 and the rear cover body 17 extend along the ceiling 5.

As described above, in the display device in a vehicle according to the preferred embodiment, the display source unit 9, which irradiates a light of a display image containing instrument information on a combiner 7 situated in front of an eye point I of the driver so that the irradiated light can be seen as a virtual image S from the eye point I, is provided with a cover member 13 consisting of: a front cover body 15 putting an optical element 21 for image magnification thereonto; and a rear cover body 17 hinged to the front cover body 15 with receiving a display device 23 therein. The cover member 13 is folded by moving the front end of the front cover body 15 backward in the vehicle and oscillating the rear end of the rear cover body 17, thereby the light of the display image displayed on a display surface 23a of the display device 23 is reflected on a reflector 25 disposed in the cover member 13 to the optical element 21, passes through the optical element 21, and goes toward the eye point I after being reflected by the combiner 7.

When the display image containing instrument information is not necessary to be seen as the virtual image S from the eye point I, the cover member 13 is set in its unfolded state so as to keep the cover member 13 from protruding toward the interior of the vehicle, thereby the driver is free from the physical or mental oppressive feeling to the head upon the driver's getting on and off the vehicle, since the cover member in the unfolded state is not an obstruction for the driver.

The construction, in which the light of the display image for illumination displayed on the display surface 23a of the display device 23 can illuminate the position of the driver or the fellow passenger in the unfolded state of the cover member 13, may be omitted. However, by employing such a construction, when the display image containing instrument information is not necessary to be seen as the virtual image S from the eye point I, the display source unit 9 can function as a room lamp, that is, the display source unit 9 can be effectively utilized, making such a construction advantageous.

When the display source unit 9 can be effectively utilized as described above, in the unfolded state of the cover member 13, the illuminated position (corresponding to the specific position in the interior of the vehicle) by the light of the display image for illumination is not limited to the position of the driver or the fellow passenger, instead the illuminated position may be an optional position such as the center, rear and whole of the interior of the vehicle.

The construction, in which the optical element 21 for magnification is put onto the light transmission window 15a of the front cover body 15, may be omitted. However, by employing such a construction, when the light of the display image passes through the light transmission window 15a after being reflected by the reflector 25, the flux of the light of the display image is enlarged by the optical element 21 enlarging the display image to be seen as the virtual image S from the eye point I, thereby giving an advantage of improving the visibility of the virtual image S.

The reflector 25 may be constructed so that the position thereof changes in response to the change in the state of the cover member 13, similarly to the optical element 21 or display device 23. However, as described in the preferred embodiment, it is advantageous that the position of the reflector 25 is constructed so as not to change no matter what the cover member 13 is in its folded state or unfolded state, that is, constructed the position of the optical element 21 or the display device 23 to change to an appropriate position in response to the change in the state of the cover member 13 between the folded and unfolded states, thereby the surrounding of the reflector 25 can be simplified since the position of the reflector 25 is not necessary to be changed in response to the change in the state of the cover member 13.

The construction for changing the state of the cover member 13 is not limited to that explained in the preferred embodiment, instead the rear end of the rear cover body 17 may be set movable in the front-and-rear direction of the vehicle as well as the front end of the front cover body 15, for example.

In the preferred embodiment, the combiner 7 consists of a non-regular reflection-type hologram, instead a combiner 7' consisting of a usual regular reflection-type hologram or half mirror may be employed provided that it can be placed with an upward angle as shown by the alternate long and short dash lines in FIG. 1.

In the preferred embodiment, explained is the display source unit, which irradiates the light of the display image containing instrument information onto the combiner, instead the present invention also can be applied to a display source unit, which irradiates the light of the display image containing instrument information onto a windshield.

What is claimed is:

1. A display source unit for a display device in a vehicle disposed at a ceiling of the interior of the vehicle, by which a light of a display image to be seen as a virtual image from an eye point in the interior of the vehicle is projected on a projected position visible from the eye point in such a manner that the light is reflected on the projected position to the eye point, comprising a cover member, which is held by the ceiling and covers a part of the ceiling, consisting of two cover bodies divided each other in the front-and-rear direction of the vehicle, coupling the two cover bodies together in such a manner that a state of the coupling can be selected out of an unfolded state, in which the two cover bodies are brought close to the ceiling and extended along the ceiling, and a folded state, in which the two cover bodies are brought away from the ceiling and extended in an inclined direction relative to the ceiling, wherein a display device for luminously displaying the display image on a display surface thereof is mounted in the rear cover body out of the two cover bodies with the display surface facing the ceiling, while the front cover body out of the two cover bodies is provided with a light-outgoing section, which enables a light to come out from a space formed between the cover member and the part of the ceiling covered by the cover member toward the outside of said space, said space receives a reflector therein, and in the folded state of the cover member, the display device, the light-outgoing section and the reflector are relatively arranged to each other so that after being reflected by the reflector the light of the display image is irradiated on the projected position by way of the light-outgoing section and a virtual image of the display image is seen from the eye point.

2. The display source unit for a display device in a vehicle according to claim 1, wherein in the unfolded state of the cover member, the display device, the light-outgoing section and the reflector are relatively arranged to each other so that after being reflected by the reflector the light of the display image is irradiated on a specific position in the interior of the vehicle by way of the light-outgoing section.

3. The display source unit for a display device in a vehicle according to claim 1 or 2, wherein the light-outgoing section consists of an optical element for image magnification, which is fit into the front cover body.

4. The display source unit for a display device in a vehicle according to claim 1 or 2, wherein the reflector is fixed in said space.

5. The display source unit for a display device in a vehicle according to claim 1 or 2, wherein both front and back ends of the cover member in the front-and-rear direction of the vehicle is regulated with respect to the movement thereof in the direction of approaching to and leaving from the ceiling, and at least one end out of both front and back ends of the cover member is movable in the front-and-rear direction of the vehicle.

* * * * *